Sept. 18, 1951  J. M. CAGE  2,568,484
POWER SUPPLY
Filed Oct. 4, 1947  4 Sheets-Sheet 1
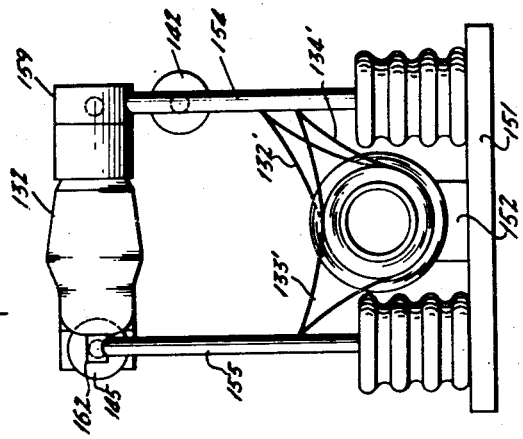
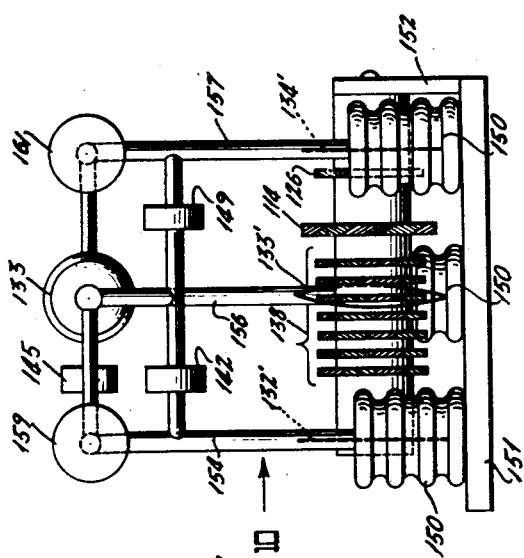
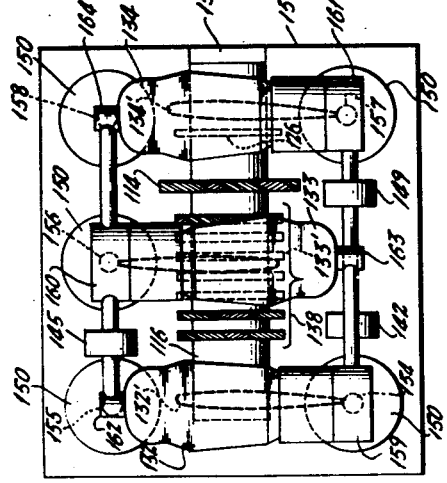
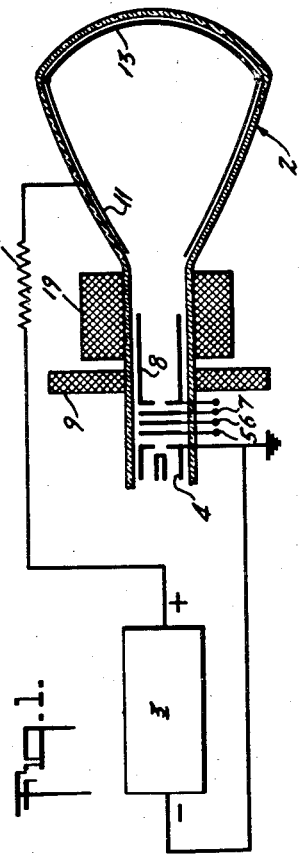
INVENTOR
JOHN M. CAGE
BY
Bartlett Eyre Keel & Weymouth
ATTORNEYS Sept. 18, 1951  J. M. CAGE  2,568,484
POWER SUPPLY
Filed Oct. 4, 1947  4 Sheets-Sheet 2
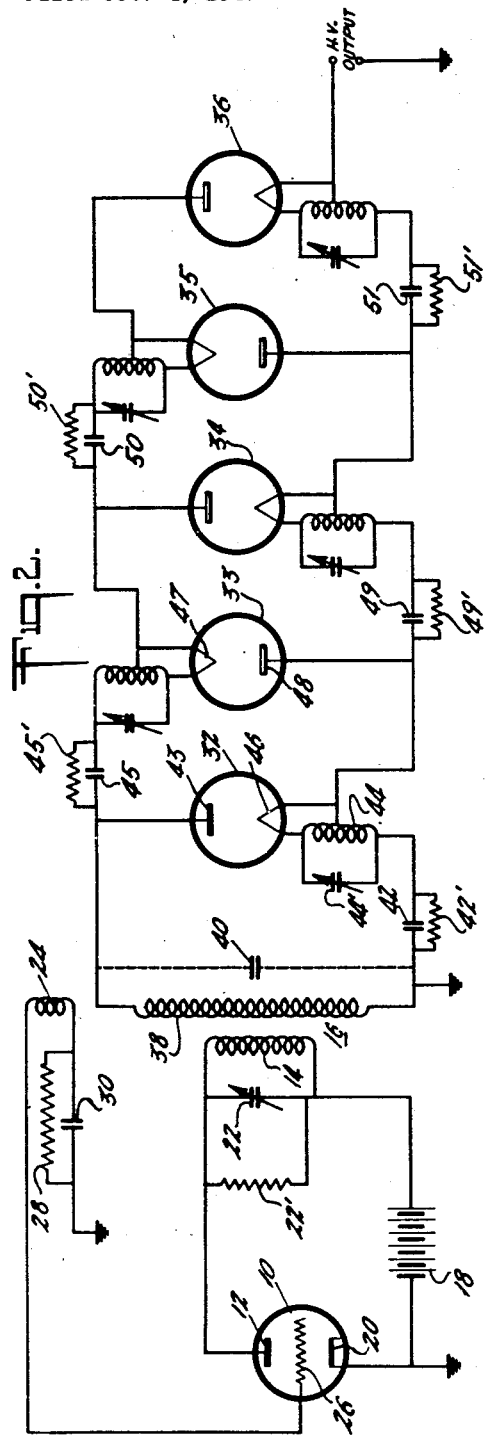
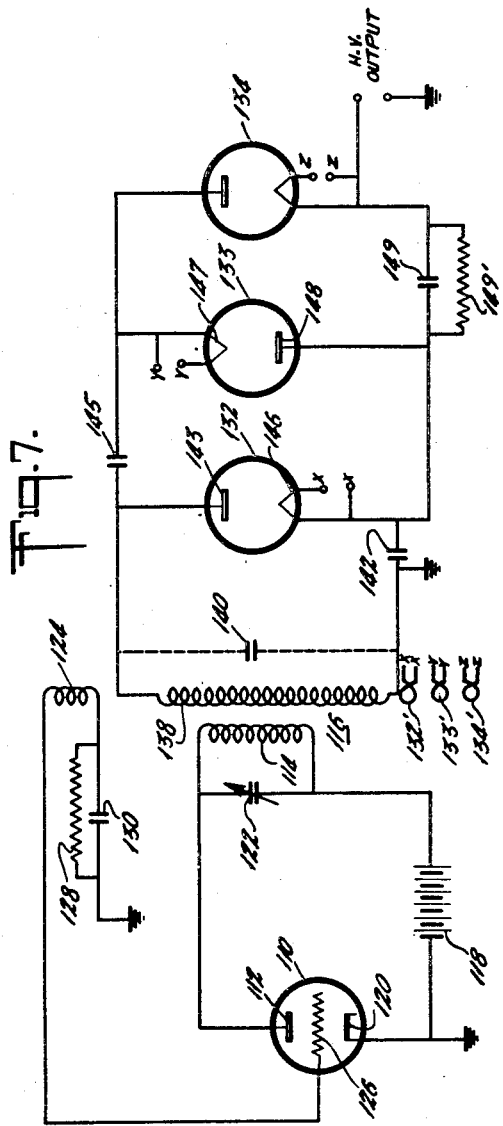
INVENTOR
JOHN M. CAGE
BY
Bartlett Eyre Keel & Weymouth
ATTORNEYS Sept. 18, 1951 J. M. CAGE 2,568,484
POWER SUPPLY
Filed Oct. 4, 1947 4 Sheets-Sheet 3
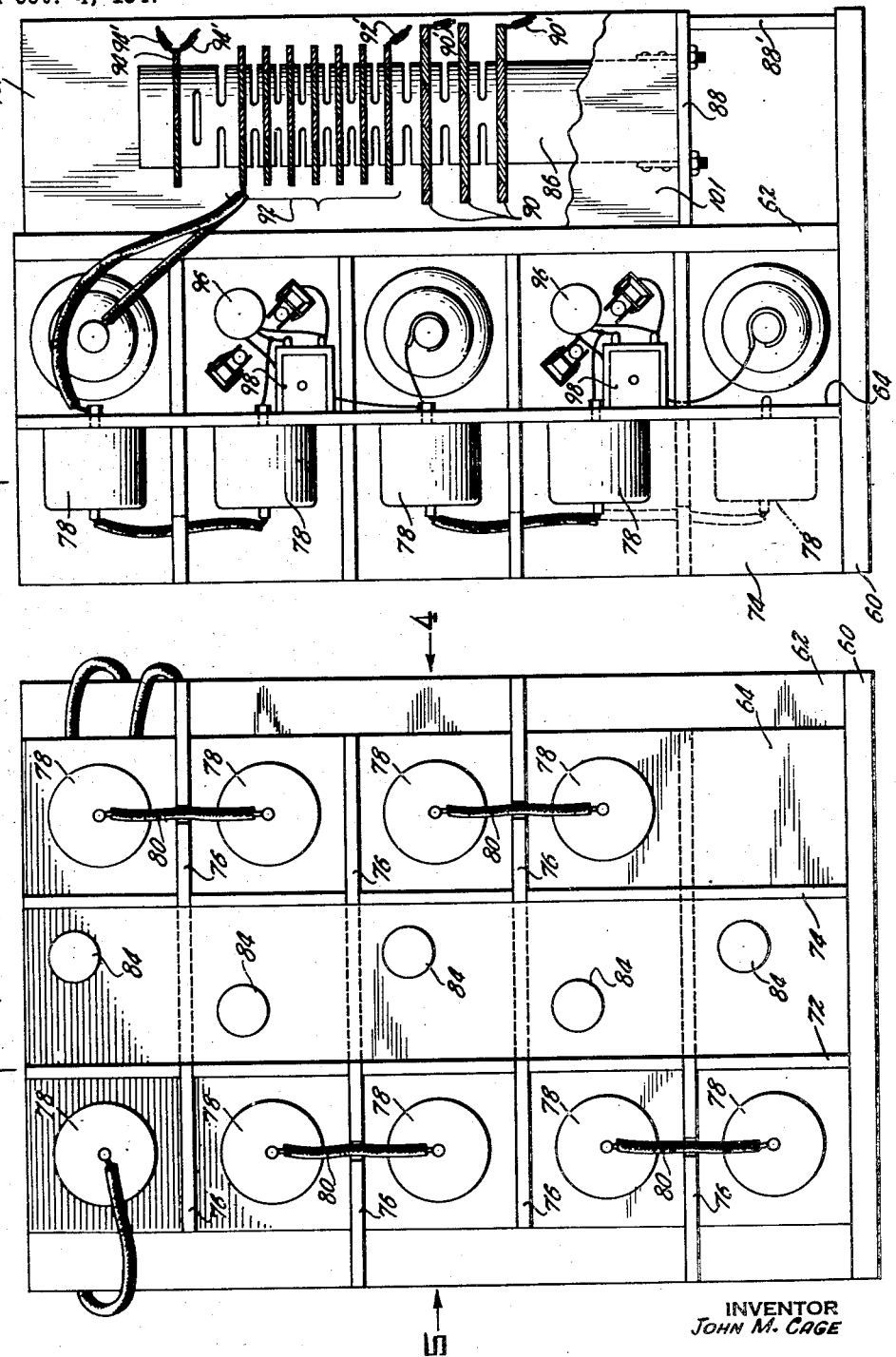
INVENTOR
JOHN M. CAGE
ATTORNEYS

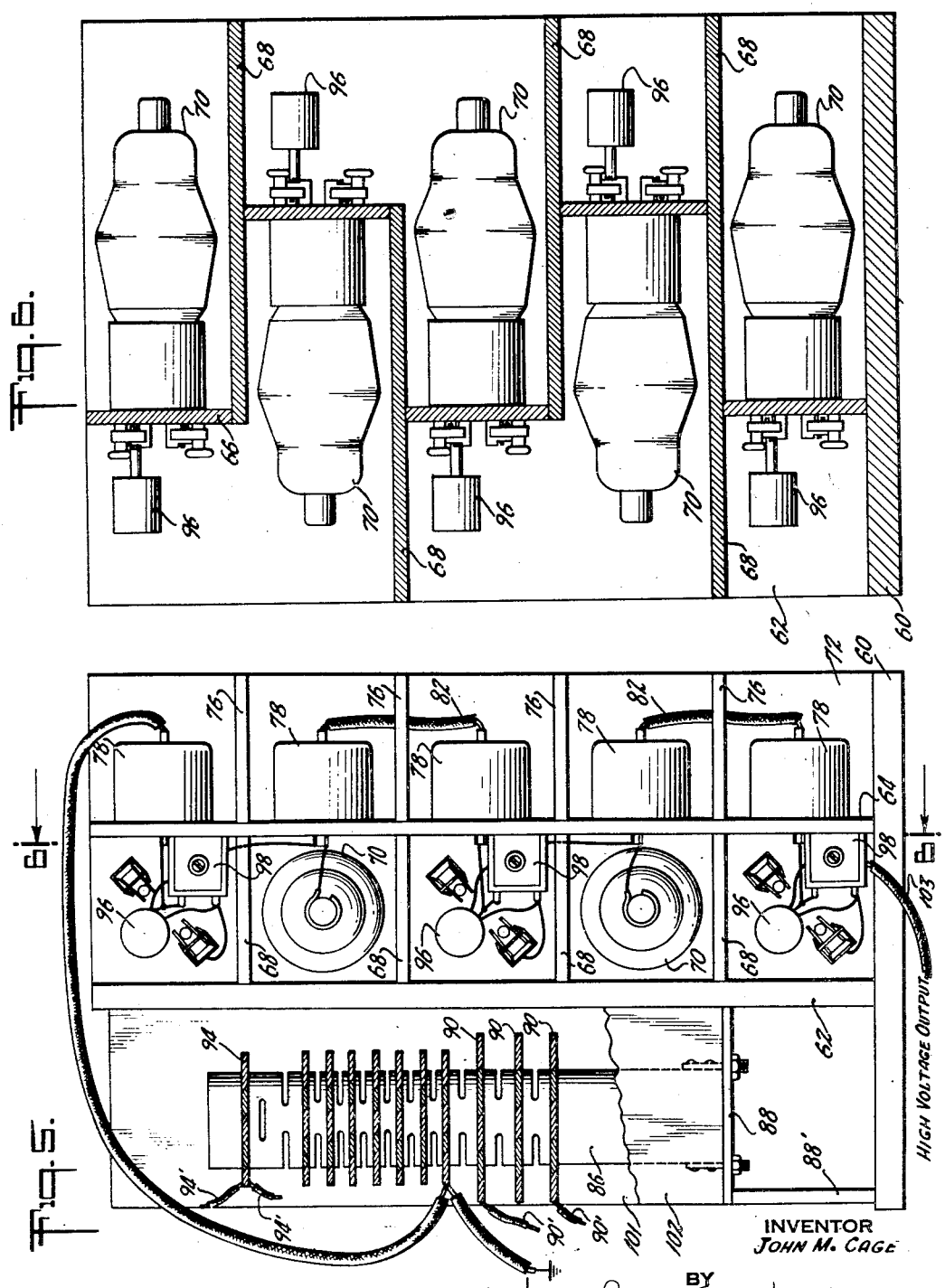

Patented Sept. 18, 1951

2,568,484

UNITED STATES PATENT OFFICE 2,568,484

POWER SUPPLY

John M. Cage, Montclair, N. J., assignor to Cage Projects, Inc., Union City, N. J., a corporation of New Jersey Application October 4, 1947, Serial No. 777,955

13 Claims. (Cl. 321—2)

This invention relates to thermionic circuits and particularly to circuits and circuit means for use in television although certain features thereof are of more general application.

One object of the invention is a novel and improved receiving circuit for television whereby the desired brightness and definition of pictures may be obtained with a minimum of eye strain.

A further object of the invention is an improved television image projection circuit whereby the desired brightness and definition may be obtained for the reproduction of images on large screens.

A further object of the invention is a novel and improved circuit of the above indicated character including a novel and improved high voltage power supply means.

A further object of the invention is a novel and improved high voltage receiving circuit for television characterized by the provision of means for minimizing damage to the reproducing equipment.

Another object of the invention is to provide a voltage multiplier circuit having improved stability and voltage regulating characteristics.

Another object is the attainment of improved reproduction of television images.

Another object is a new and improved power supply for generating high direct current potentials that is compact and has a substantially reduced corona loss.

It is also a purpose of this invention to provide a high voltage supply for use with television and like projecting tubes that will afford maximum protection for the tubes under normal operating conditions.

Another object of the invention is a novel and improved thermionic circuit.

The above and other objects and advantages of this invention will become more apparent in the following specification and drawings forming part of this application.

In the drawings:

Fig. 1 is a schematic diagram of an electronic circuit in accordance with the invention.

Fig. 2 is a wiring diagram of another electronic circuit in accordance with the invention.

Fig. 3 is a front elevation of a power supply in accordance with the invention.

Figs. 4 and 5 are side elevations of the embodiment shown in Fig. 3;

Fig. 6 is a section along the line 6—6 of Fig. 5;

Fig 7 is a circuit diagram similar to that in Fig. 2 illustrating another form of the invention; and Figs. 8, 9 and 10 are top, front and side views of another form of power supply in accordance with the invention.

According to conventional practices as I know them, reproducing tubes for televised images and especially the projection type tube, are operated with a very high beam current in order to obtain maximum brightness for projection of the image on the screen. The beam current is controlled by the second anode or accelerating voltage and the negative bias on the control grids of the tube, while the characteristics of the screen determine the maximum allowable beam current that can be employed without the danger of burning or otherwise injuring it. Present day projection tubes with which I am familiar are generally operated with beam currents of 2.5 to 3 milliamperes and anode voltages ranging from about 10,000 to 30,000 volts, depending on the tube and screen construction.

I have found that it is possible to obtain increased brilliance as well as improved image definition and contrast by operating projection tubes with substantially decreased beam currents and correspondingly greater accelerating potentials. I have had particularly good results with beam currents as low as 300 microamperes and even lower and with accelerating potentials of the order of 75 kilovolts and higher. With the application of such high second anode or accelerating potentials it is of course necessary to greatly increase the negative bias on the control grid in order to maintain the low beam current. By operating projection tubes in this manner, increased brilliance is attained since the resulting increase in energy by increasing the speed of the electrons in the beam greatly exceeds the energy lost by reducing the current density of the beam or the number of electrons in the beam at any one time. I have also found that present metallized screens can withstand the increased energy imparted to them by my method provided the beam current is maintained at a low value.

With the application of these greatly increased accelerating potentials, there is a possibility of danger to the tube by reason of the voltage arcing through the tube to ground. This arcing or flash-back may be obviated by limiting the current to the second or accelerating anode. For example, I have interposed a relatively high resistance in series with the supply so that the current is limited to a value below that required to cause and sustain arcing. Moreover, with the use of a high series resistance in this manner it is possible to apply much higher anode potentials than would otherwise be possible with the resultant increase in picture brightness. These results are obtained, as indicated, with beam currents substantially lower than is customary in conventional practice as I know it.

Furthermore, with the use of the very low beam currents it is possible to obtain improved contrast and definition, since the beam can be focussed to produce a much smaller spot than would otherwise be obtainable with the larger currents.

In Fig. 1 I have illustrated a reproducing tube 2 connected with a high voltage power supply 3 in accordance with the method heretofore discussed. The tube 2 is of the projection type having a cathode structure 4 connected to ground and to the negative side of the power supply 3. The tube 2 also includes the conventional control grids 5, 6 and 7 for biasing and modulating the beam and to assist in focussing it. One anode includes the cylindrical structure 8, which is surrounded by the focussing coil 9, and the second anode comprises a conductive coating 11 and the metallized screen 13. The second anode elements are connected by means of a terminal 15 and resistor 17 to the positive side of the power supply. Adjacent to the focussing coil 9 is the magnetic deflection coil 19 for deflecting the beam in the reproduction of images.

The particular value of resistance 17 must of course be determined by the particular operating conditions chosen for a particular tube. I have had good results with a 200 megohm resistor when used with a projecting tube having a 10" screen and an overall length of 17" and operated at the anode voltages and beam currents previously set forth. This resistance of course does not necessarily have to be inserted in the positive side of the supply 3 which simplifies insulating problems, but may with equally good results be inserted in the negative lead or even constitute part or all of the internal power supply impedance.

In order to obtain the greatly increased anode potentials required by my method of operating image reproducing tubes, conventional practice dictates relatively large spacing between components and specially designed shields and insulators to maintain corona losses at a minimum. Conventional power supplies for the generation of potentials of 50 to 100 kilovolts with which I am familiar require a total volume of at least 8000 to 9000 cubic inches and sometimes even greater for satisfactory operation.

By using the power supply circuits and construction now to be described, I have been able to generate voltages as high as 100 kilovolts with space requirements for only a fraction of that employed in conventional designs.

Referring now to Fig. 2, 10 denotes a triode vacuum tube connected as an oscillator to provide a source of power for a voltage multiplying and rectifying circuit which includes tubes 32 to 36 inclusive. Although a single tube 10 is illustrated, multiple tubes in pushpull or parallel can be employed to meet the necessary power requirements of the system. The plate circuit of the oscillator tube 10 includes the plate 12, the primary winding 14 of the radio frequency coupling transformer 16, the battery 18 and the cathode 20 of the tube 10. A condenser 22 is connected in parallel with the primary winding 14 so that the plate circuit can be tuned to resonance at the operating frequency.

Grid voltage for the oscillator is obtained from a feedback or tertiary winding 24 on the transformer 16. One side of this winding is connected with the grid 26 of the tube 10 while the other side is connected to ground through a parallel gridleak and condenser arrangement designated by the numerals 28 and 30, respectively. In connecting the feedback winding 24 to the grid 26 it is important that the phase of the voltage applied to the grid be 180 degrees out of phase with the plate voltages in order that oscillation be sustained.

The voltage multiplier and rectifier circuit shown employs five rectifier tubes 32 to 36 and is therefore termed a quintupler. It is fed by the secondary winding 38 of transformer 16 which steps up the voltage of the oscillator tube 10 to a desired high value. In the present adaptation the tube 10 produces about 300 volts across the primary winding 14 and this voltage is increased to about 20 kv. across the secondary winding 38. The voltage multiplier will produce an output voltage of five times the voltage appearing across the secondary winding 38 or about 100 kilovolts, not considering internal losses.

The first tube 32 of the quintupler or voltage multiplier circuit is connected across the secondary winding 38 with a condenser 42 in series. The upper end of winding 38 is connected to the plate 43 of the tube 32, while the lower or grounded end is connected to the filament through condenser 42 and a radio frequency auto transformer 44 in parallel with an adjustable condenser 44'. The transformer 44 is tuned with the adjustable condenser 44' at the operating frequency to provide the desired filament voltage across that part of the transformer 44 to which it is connected.

The second tube 33 is connected in opposition to the tube 32, with condenser 45 interposed between the filament 47 of tube 33 and the plate 43 of tube 32. It will be noted that the plate 48 of tube 33 is connected directly to the filament 46 of the tube 32 so that the major part of the winding of transformer 44 is connected between condensers 42 and 49. Since the current required to energize the tube filament is a function of the operating of the circuit as a whole, the voltage applied to the filament is substantially independent of the interelectrode capacity of the tube 32 and therefore normal tolerances experienced in the manufacture of the tubes will not require readjustment of the condenser 44' when tubes are interchanged or replaced. The effect of this arrangement, since the filament of each tube is similarly heated, produces improved voltage regulation because the circuit is not influenced by changes in tube characteristics through warping of the filament or substitution of tubes.

The remaining tubes 34, 35 and 36 together with their associated condensers 49, 50 and 51, are connected similarly to tubes 32 and 33, each successive tube and condenser being connected in opposition to the previous tube and condenser combination.

The high voltage output from the above described circuit is obtained between the filament of the tube 36 and ground. Since condenser 42 is charged by a voltage equal to that voltage appearing across the secondary 38 of transformer 16, which in the present instance is 20 kv. and condensers 49 and 51 are each charged to twice that voltage, the sum of the three condensers in series is therefore five times the voltage applied to the quintupler or 100 kv. This value is of course theoretical and the output voltage would actually be some slightly lower value, depending on circuit losses.

To obtain maximum efficiency with this power supply it is necessary that the windings of transformer 38 be properly resonated at the operating frequency. The total actual and distributed capacities of the voltage multiplier circuit, together with the inductance of the winding 38, determine the operating frequency. For illustrative purposes I have shown the multiplier capacities as condenser 40 in parallel with winding 38. Since the resonant frequency of the winding 38 is determined by the capacity of the multiplier circuit, it is only necessary to vary condenser 22 to obtain the desired oscillator frequency since the constants of condenser 22 and winding 14 determine the frequency of oscillation of the tube 10.

I have also found that in using high voltage supplies of this type the character of the load and other effects cause the total capacity across the winding 38 and as represented by condenser 40 to change a substantial amount. To obtain improved stability of the supply I have introduced a resistor 22' in parallel with the winding 14 in order to broaden the tuning of the circuit and greatly minimize changes in load as well as multiplier components due to heating, moisture and other causes. Broadening of the oscillator tuning can also be obtained by other methods such as closer coupling between the windings and the use of iron cores.

The power supply circuit in Fig. 2 in addition to its other and important advantages also includes means for protecting image reproducing tubes when used to supply the beam accelerating potential. Under ordinary operating conditions of a television receiver for instance, the high voltage supply for the tube together with the several scanning circuits are turned off and on simultaneously. The high voltage supplies, however, usually have a fairly high impedance which produces a large time delay between the time that the voltage on its capacitors reaches say 25% of the normal operating value. In most cases, therefore, the high voltage remains on the reproducing tube for some time after the scanning voltages have ceased to affect the beam. That condition is evidenced by the single spot on the screen when scanning has subsided. In ordinary equipments, however, relatively low accelerating potentials are employed and little or no damage results. The use of high potentials, such as 50 to 100 kv., presents great danger of damage to the tube if it is permitted to persist for even short periods of time. To eliminate this danger, resistors are shunted across each of the condensers 42, 45, 49, 50 and 51 of Fig. 1 and are designated 42', 45', etc. I have had particularly good results with resistors which in combination with the capacities across which they are shunted produce a time constant of approximately .1 of a second. That is, the voltage on the condenser falls to about 25 to 30% of its peak value within about .1 of a second after the power is turned off. Since the scanning voltages exist for a somewhat longer period, little danger of damage to the reproducing tube exists.

I have also found that similar results can be attained by the use of a resistor across only one condenser such as condenser 51 since the important factor is the reduction of the high voltage to a low safe value before scanning has ceased in order to prevent burning of the image screen on the end of the reproducing tube.

Figs. 3 to 6 inclusive represent a power supply embodying the circuit as shown in Fig. 1 and with which I have had particularly good results. The new and improved design and circuit provide a stable and dependable source of high voltage with extremely low corona losses. It forms a small compact unit, which to my knowledge can not be attained by conventional recommended practices. In view of the wide use of television in the home, it is therefore possible with this invention to effect a considerable saving in space with a resultant reduction in cabinet size requirements when large cathode ray tubes or projection tubes are used.

This embodiment of the invention concerns, among other features, the arrangement of the rectifier tubes and condensers as well as the interposition between adjacent tubes and condensers of dielectric baffling or barriers to reduce ionization of the air and resultant corona losses. With this arrangement, an exceedingly compact supply can be made that may occupy as little as one-fifth of the space presently required by supplies known to me that are designed for the generation of equivalent voltages. I have also had particularly good results with dielectric materials composed of fused mica and glass although other dielectrics having similar properties could be also used.

In these figures, 60 denotes a base of dielectric material and 62 and 64 vertically disposed parallel plates also of a dielectric material and rigidly secured to the base by a suitable cement such as glyptol. The distance between these plates is governed by the diameter of the rectifier tubes employed which in the present adaptation are conventional 1Y2 rectifier tubes although other suitable types of rectifiers may be used. These particular tubes measure about 1½ inches in diameter and the spacing between the plates is therefore of the order of 1¾ inches to 2 inches. The several tubes are disposed parallel to and centrally of the plate 62 as shown in Fig. 6.

To insure low corona losses, each tube is dielectrically shielded from its adjacent tube by L-shaped partitions having a tube socket formed in shorter leg 66 and the longer leg 68 extending from one side of the base 66 to the edge of plate 62. The rectifier tubes 70 (shown in Fig. 1 as 32 to 36 inclusive) are each successively inverted to maintain the lowest possible potential between adjacent portions of successive tubes as well as to facilitate wiring and other reasons.

On the outer surface of the dielectric plate 64 are a pair of vertically disposed strips 72 and 74, also of a dielectric material which together with a series of short dielectric partitions 76 form individual compartments for the high voltage condensers 78. To facilitate wiring of the power supply, certain of the partitions 76 are slotted as at 80 to receive connecting wires 82 for connecting pairs of the adjacent condensers 78 in series. A series of holes 84 is formed in the plate 64 directly opposite each of the filaments of the tubes 70 in order to permit observation of them when the device is in operation.

The radio frequency transformer 86 (illustrated at 16 in Fig. 2) is mounted at the rear of the plate 62 on a shelf of dielectric material 88 supported above and parallel to the base 60 by a strip 88'. On either side of the transformer 86 are dielectric insulating or shielding partitions 101 and 102 extending from the shelf 88 to a point above the transformer 86 and cemented or otherwise rigidly fastened to the shelf 60 and the plate 62. The transformer includes three series connected primary windings 90, seven secondary windings or pies 92 connected in series one with the other and the feedback winding 94. Each filament transformer 96 and its associated condenser 98 for each tube is mounted at the base of its associated tube. One of these transformer-condenser combinations is designated in Fig. 2 as 44 and 44' respectively.

With the arrangement of parts as described above, the connections between components as illustrated are extremely short and they are so arranged that in most instances the component forms part of the wiring. The voltage difference between adjacent components is retained at a minimum and with the use of the compartment structure there is practically no tendency for ionization of the air and attendant corona losses.

It will be noted that in the arrangement of the wiring the secondary 92 of the transformer 86 is connected to the uppermost tube 70 whereas the high voltage output from the supply is taken from the tube 70 nearest the base 60. This high voltage lead is indicated at 103. The high voltage is therefore built up in successive steps from top to bottom so that the final distances between the high voltage terminal and ground greatly exceeds the arc-over potential and with the interposition of the dielectric material maximum safety is attained.

It has been shown in actual practice that this novel and improved high voltage supply enables the generation of voltages of the order of 100 kv. in a very small space with no danger of arc-over between components and with little or no corona loss evident. I have also found it desirable to fill the compartments at the base of each tube 70 with a paste-like insulating compound that possesses high dielectric properties and is relatively unaffected by temperature. One such substance that is particularly good is a paste-like form of silicone resin which possesses exceptionally good insulating properties. Under certain conditions, it is also advantageous to enclose the transformer in this paste-like silicone resin which further reduces corona losses and the possibility of arcing.

The radio frequency oscillator illustrated in Fig. 2 is not shown in Figs. 3 to 6 inclusive, as its construction and arrangement of parts may be accomplished in any suitable manner. The leads 94' of the feedback coil 94 and the leads 90' of the primary 90 are connected with the oscillator, which is spaced from the high voltage supply in the manner illustrated in Fig. 2.

Figs. 7 to 10 inclusive show an alternate embodiment of the invention wherein three rectifier tubes in a voltage tripler circuit are used with an alternate filament arrangement. The tripler circuit (Fig. 7) operates on the same principle as the quintripler circuit previously described and a like series of numerals have therefore been used to designate corresponding parts. For instance, the oscillator tube 10 in Fig. 2 is designated by numeral 110 in Fig. 7, etc. The filaments of the three rectifier tubes 132, 133 and 134 in Fig. 6 are heated by an alternate circuit arrangement employing coils 132', 133' and 134' associated with the transformer 116. The connecting leads between these windings and the tubes have been omitted and the letters X—X, Y—Y and Z—Z used to designate the terminals of the windings and tubes that are to be connected.

This alternate embodiment of the invention is primarily intended for the generation of voltages of the order of 20 to 30 kv. which value is obviously governed by the tube and component spacing character of the insulating materials, etc.

The components of this unit are mounted on five stand-off insulators 150 firmly fastened to a base 151 which is preferably of an insulating material possessing high dielectric properties. The radio frequency transformer 116 is disposed in a horizontal position on the base and fastened by the bracket 152 also of an insulating material.

The tubes 132, 133 and 134 together with the condensers 142, 145 and 149 are supported by metal tubes 154 to 158 inclusive extending upwardly from each of the stand-off insulators 150. These metal tubes in addition to providing mechanical support, carry the leads connecting the components. For instance, the transformer filament windings 132', 133' and 134' are supported by the metal tubes 154, 156 and 157, respectively, and the lead wires are passed through them to their respective rectifier tubes. At the base of the rectifier tubes are cylindrical housings 159, 160 and 161 in which the sockets for the tubes are mounted. At the other end of each tube a somewhat smaller housing 162, 163, 164 is provided to receive and shield the rectifier tube cap. With the use of transverse metal tubes for supporting the condensers 142, 145 and 149 all of the connections are completely shielded to reduce corona losses and the components are arranged and positioned to maintain relatively low potential differences between adjacent components. In this adaptation of the invention the condenser 142 is charged to a voltage equalling that voltage developed by the secondary 138 of the transformer 116 and condenser 149 is charged to twice that value. The output from the supply is obtained by the discharge of these condensers in series which produces a total voltage of three times that appearing across the secondary winding 138.

In this alternate embodiment I have also found the use of resistors shunting the condensers effective in affording protection for image reproducing tubes. In Fig. 7 I have illustrated only one such resistor 149' connected across condenser 149. Additional resistors could of course be connected across condensers 142 and 145 to effect an even more rapid reduction of voltage when the power is turned off.

In the construction of high voltage multiplier type circuits of the character described herein it is important to fix the frequency of the oscillator so that it will not interfere with radio frequency circuits in the television receiver. It is desirable to have the oscillator frequency so arranged that neither the fundamental nor any of its harmonics will be in the vicinity of the radio frequencies used by the receiver. I have found that if the first condenser, such as condenser 42 of Fig. 2, is made large, say of the order of 500 mmfd., and the remaining condensers, such as 45, 49, 50 and 51, of substantially lower capacity, say of the order of 250 mmfd., there is sufficient capacity in the condenser 42 so that by varying it alone substantial changes in frequency can be accomplished.

With my invention I have been able to reproduce pictures on screens as large as four feet by six feet and even larger with greatly improved brightness, contrast and definition and with the complete television receiving and reproducing

I claim:

1. A high voltage power supply for television reproducing tubes comprising a source of radio frequency energy including a radio frequency transformer having a secondary winding thereon, at least two rectifier tubes placed side by side with each connected in series with a capacitor to form a voltage multiplier circuit powered by the radio frequency energy induced in said secondary winding, an individual filament circuit for each tube, and dielectric partitions interposed between each tube to insulate the tubes one from the other.

2. A high voltage power supply according to claim 1 wherein the tubes are successively inverted one with respect to the other.

3. A high voltage power supply for television reproducing tubes comprising a source of radio frequency energy including a radio frequency transformer having a secondary winding thereon, at least two rectifier tubes connected to form a voltage multiplier circuit powered by the radio frequency energy induced in said secondary winding, and individual filament circuits at the base of each tube for heating the filament of its associated tube, said tubes being placed side by side with each tube inverted with respect to its adjacent tubes and dielectric partitions between adjacent tubes.

4. A high voltage power supply of the multiplier type comprising a source of radio frequency energy, a plurality of rectifier tubes and condensers connected to rectify and multiply the voltage of the source, said rectifier tubes being arranged in parallel relationship and each successive tube being inverted with respect to the previous tube and wherein each rectifier tube and each condenser being insulated from the other rectifier tubes and condensers by at least partially enclosing it with a dielectric material.

5. A high voltage power supply for television reproducing tubes comprising a source of radio frequency energy, a plurality of rectifier tubes and condensers connected with said source to form a voltage multiplying and rectifying circuit for the generation of a high potential for application to said reproducing tubes, said rectifier tubes being disposed in parallel relationship with successive tubes inverted with respect to its previous tube, and each of said rectifier tubes and condensers being disposed in individual compartments formed of a dielectric material.

6. The mounting for a multiplier type high voltage direct current power supply employing a multiplicity of rectifier tubes and capacitors, a source of radio frequency power, and a radio frequency transformer, comprising a pair of plates of dielectric material in spaced parallel relationship, parallel partitions between said plates to form individual compartments for each tube, tube sockets mounted in opposite ends of successive compartments to support said tubes, condensers mounted on the outer face of one of said plates with dielectric plates separating them one from the other, a base for supporting the parallel plates in perpendicular relationship thereto, and a dielectric support on said base for supporting the radio frequency transformer adjacent the outer face of the other of said plates.

7. In a high voltage power supply of the multiplier type, a high frequency source of power, a plurality of rectifier tubes and condensers connected to multiply and rectify the voltage of the power source, and individual circuits for heating the filament of the rectifier tubes, each circuit consisting of a coil and condenser with the tube filament connected in parallel with part of the coil and at least part of the coil in series with each pair of associated condensers whereby the voltage applied to the filaments varies proportionally with the load placed on the output of the supply.

8. In a high voltage power supply of the voltage multiplier type having a plurality of rectifier tubes and condensers, individual means for heating the filaments of each rectifier tube comprising a circuit having a coil and condenser in parallel with the filament of its associated tube connected in parallel with at least part of the winding on said coil and at least part of said coil being connected to form part of the charging circuit for said condensers whereby the voltage applied to the filaments of each of said tubes varies in a manner proportional to the load current on said supply.

9. A high voltage power supply comprising a radio frequency source of power, a plurality of rectifier tubes and condensers connected with said high frequency supply to multiply and rectify the voltage therefrom, said rectifier tubes being arranged in substantially a parallel arrangement with each successive tube being inverted with respect to the previous tube, dielectric means separating each condenser and each rectifying tube from the other condensers and rectifying tubes, and individual filament heating means for each tube comprising a coil and condenser connected to form a parallel resonant circuit with at least part of said coil being connected in parallel with the filament of its associated tube and at least part of the coil in series with said condensers so that the voltage applied to the filament will vary proportionally with changes in load current.

10. A high voltage power supply comprising a radio frequency source of power, a plurality of rectifier tubes and condensers connected with said high frequency supply to multiply and rectify the voltage therefrom, said rectifier tubes being arranged in substantially a parallel arrangement with each successive tube being inverted with respect to the previous tube, dielectric means separating each condenser and each rectifying tube from the other condensers and rectifying tubes, and a resistor connected in parallel with at least one of said condensers to increase the rate of discharge of said condenser when the voltage from the high frequency source is interrupted.

11. A power supply according to claim 10 wherein a resistor is connected in parallel with each of said condensers.

12. A rectifier-multiplier type high voltage power supply comprising at least two rectifier tubes, individual means for heating the filament of each tube, adjoining compartments formed of dielectric material for each tube with said tubes mounted in said compartments, each tube being inverted with respect to the preceding tube, and said filament heating means being mounted at the base of its associated tube.

13. A high voltage power supply for television comprising a plurality of rectifier tubes connected to form a voltage multiplier circuit arranged in closely disposed parallel relationship, a high frequency power source connected with said multiplier circuit, a dielectric housing closely surrounding said tubes and dielectric partitions in said housing forming individual compartments for each tube, means for supporting each tube within its respective compartment and individual filament heating means for each tube mounted at the base thereof.

JOHN M. CAGE.

REFERENCES CITED

The following references are of record in the file of this patent:

UNITED STATES PATENTS

| Number | Name | Date |
|---|---|---|
| 1,257,978 | Chubb | Mar. 5, 1918 |
| 1,717,831 | Borland | June 18, 1929 |
| 1,911,341 | Apple | May 30, 1933 |
| 1,974,328 | Bouwers | Sept. 18, 1934 |
| 2,095,705 | Kessler | Oct. 12, 1937 |
| 2,104,463 | Johnson et al. | Jan. 4, 1938 |
| 2,107,903 | Peters | Feb. 8, 1938 |
| 2,130,441 | Wohlforth et al. | Sept. 20, 1938 |
| 2,137,356 | Schlesinger | Nov. 22, 1938 |
| 2,219,292 | Bouwers | Oct. 29, 1940 |
| 2,226,745 | Schrack | Dec. 31, 1940 |
| 2,247,057 | Hull | June 24, 1941 |
| 2,305,720 | Lindenblad | Dec. 22, 1942 |
| 2,355,191 | Vance | Aug. 8, 1944 |

FOREIGN PATENTS

| Number | Country | Date |
|---|---|---|
| 246,909 | Great Britain | Feb. 3, 1926 |

OTHER REFERENCES

Science News Letter (page 41), July 20, 1946.
R. F. Operated H. V. Supplies—Schade, April 1943, Pub. No. St. 235 by RCA.